United States Patent [19]

Pittroff deceased

[11] Patent Number: 4,476,614
[45] Date of Patent: Oct. 16, 1984

[54] METHOD OF ADJUSTING A TWO ROW ROLLING BEARING HAVING ADJUSTABLE PRESTRESS IN THE AXIAL DIRECTION

[75] Inventor: Hans Pittroff, deceased, late of Schweinfurt, Fed. Rep. of Germany, Irmgard, Pittroff, executrix

[73] Assignee: SKF Kugellagerfabriken GmbH, Schweinfurt, Fed. Rep. of Germany

[21] Appl. No.: 540,095

[22] Filed: Oct. 7, 1983

Related U.S. Application Data

[62] Division of Ser. No. 309,415, Oct. 7, 1981, abandoned.

[30] Foreign Application Priority Data

Oct. 9, 1980 [DE] Fed. Rep. of Germany ....... 3038112

[51] Int. Cl.³ ............................................. B21D 53/12
[52] U.S. Cl. .......................... 29/148.4 A; 29/148.4 D; 384/570
[58] Field of Search ................... 29/148.4 A, 148.4 D, 29/525, 447, 436; 308/189 R, 189 A, 197

[56] References Cited

U.S. PATENT DOCUMENTS

| | | | |
|---|---|---|---|
| 1,399,959 | 12/1921 | Hanson | 308/197 |
| 1,998,994 | 4/1935 | Lewis | 29/525 X |
| 2,387,105 | 10/1945 | Yager | 308/189 R |
| 3,579,780 | 5/1971 | Matt et al. | 29/447 X |
| 3,785,023 | 1/1974 | Harbotle | 29/148.4 A |
| 3,900,232 | 8/1975 | Rode | 308/189 A X |
| 3,943,803 | 3/1976 | Hafla | 82/30 |
| 4,116,506 | 9/1978 | Moritomo et al. | 308/189 A |
| 4,121,331 | 11/1978 | Fukuma et al. | 29/447 X |

FOREIGN PATENT DOCUMENTS

| | | | |
|---|---|---|---|
| 906381 | 8/1972 | Canada | 229/447 |
| 867591 | 9/1981 | U.S.S.R. | 29/545 |

Primary Examiner—Carl E. Hall
Assistant Examiner—John Burtch
Attorney, Agent, or Firm—Daniel M. Rosen

[57] ABSTRACT

A rolling bearing arrangement has two axially spaced rolling bearings with their inner rings shrunk to a shaft and their outer rings interference fit in a housing. The outer ring of one bearing engages a radial abutment surface, and a spring extends between another abutment surface and the outer ring of the other bearing. Inner and outer locating rings held on the shaft and in the housing respectively abut the inner and outer rings of the second bearing. The arrangement enables the accurate axial prestressing of the bearing by selective heating of portions of the arrangement and application of weight thereto.

2 Claims, 1 Drawing Figure

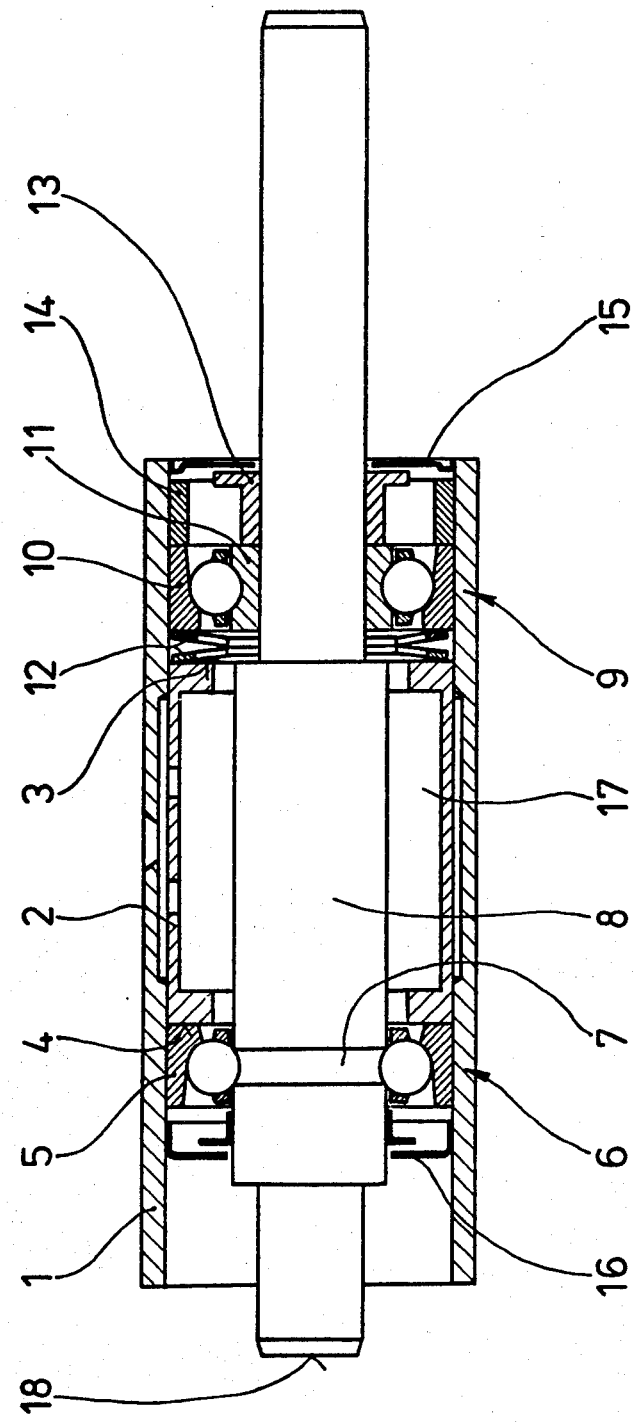

METHOD OF ADJUSTING A TWO ROW ROLLING BEARING HAVING ADJUSTABLE PRESTRESS IN THE AXIAL DIRECTION

This application is a Div. of Ser. No. 309,415, 10/7/81, now abandoned.

BACKGROUND OF THE INVENTION

In a known two-row rolling bearing arrangement mounted on a shaft supported in a housing and having adjustable prestress in the axial direction, the first rolling bearing is located in the housing or on the shaft and the outer ring of the second rolling bearing can be displaced in the housing by using a spring on one side which forces the first rolling bearing away and an adjustable member for supplying the spring force on the other side (U.S. Pat. No. 1,399,959, wherein the adjustable member is a ring screwed onto the housing. In spite of the involved arrangement of the two threads, the limits of adjustment are relatively wide as compared to the degree of fineness of prestress adjustment obtainable by the ring setting and reached by respective loading or relieving of the spring, even if a thread of particularly low pitch is used, which further increases the degree of involvement. Therefore the known arrangement is used only to compensate for a discernible axial play caused by wear after a long service life of the bearing by resetting the respective rings, thereby resulting in a new adjustment of the prestress. The actual original and newly adjusted magnitudes of the prestress are only approximmately known and the magnitude can be adjusted only to approximate a predetermined magnitude. The motion of the adjustable member within the course of a thread has also the general disadvantage that a one-sided load is applied upon the outer ring, as a result of which the loosely fitted outer ring gets misaligned, which has a detrimental effect upon bearing operation. The known arrangement is therefore not suited for use in bearing arrangements which require high-precision operation.

SUMMARY OF THE INVENTION

The main object of the present invention is to provide an arrangement for adjusting prestress without the above deficiencies in a bearing arrangement running at high speed under continuous operation ($n \cdot d_m \approx 10^6$) thereby allowing the single and accurate obtaining of the prestress required for the freedom from axial play for the bearing.

By means of an essential departure from the known arrangement, it is possible according to the invention, due to the also displaceable inner ring of the second rolling bearing to give the bearing arrangement during mounting a prestress of known magnitude by subjecting this inner ring to a special load and then to reduce this prestress to the then remaining predetermined prestress by relief obtained by means of another known force acting on the outer ring. With the arrangement in the vertical position, loading and relieving can easily be conducted by applying, for instance, different weights to the inner and outer rings and the associated locating ring and adjustable member by means of mounting sleeves. By locating the bearing rings on the shaft or in the housing, no forces will arise which cause misalignment of the bearing rings in their seats, whereby the disadvantage of the known kind of adjustment is avoided and a seat of the bearing rings is obtained that ensures high running accuracy and that maintains the given prestress by including the internal strain of the bearing components. The rings of the second rolling bearing, which can be displaced only during the mounting procedure, can be located in the same way as the associated locating rings either by shrinkage or by another method, for example, by giving them to the required position on the shaft or in the housing. This also contributes to high running accuracy of the bearing arrangement. The fretting corrosion arising in the known bearing arrangement can also be avoided.

The present invention ensures in an easy manner a high running accuracy of the bearing components within the bearing housing, which enables seating of both rolling bearings and determination of the prestress. Also the determination of the prestress is simplified and improved in so far as no mechanical working of the supporting surfaces within the bearing housing is required, such supporting surfaces rather being created by introducing into the housing part a sleeve which can be exactly worked prior to installation to ensure that its side faces are parallel. Such parallelism cannot be accurately obtained by cutting blind holes in the interior of the bearing housing.

According to the present invention both rolling bearings are configured as special ball bearings, thereby on the one hand, simplifying the set-up and the mounting of the bearing arrangement and, on the other hand, incorporating the important functional advantage that a great supporting surface is obtained due to the existing back-to-back arrangement of the bearings, which gives rise to high static rigidity and dynamic stability.

Further in accordance with the invention it is ensured that as a result of heating of the shaft and the bearing housing arising during bearing operation, the shrink fit of the components locating the two displaceable bearing rings is even increased so that the prestress arising when mounting the bearing arrangement cannot change inadmissibly during bearing operation.

BRIEF DESCRIPTION OF THE DRAWING

The invention is illustrated by way of a longitudinal sectional view through the bearing arrangement.

DETAILED DESCRIPTION OF THE PREFERRED EMBODIMENT

Referring to the drawing a two-part housing consists of a housing part 1 and a bushing 2 tightly inserted into this housing part. The bushing 2 is given an exact seat in the housing part 1 by inserting into the housing part 1, during the mounting procedure a mounting sleeve (not shown) of respective length, the mounting sleeve having one end surface flush with one end of the housing part 1 and forming at its other end, a stop for the one axial end of the bushing 2 when the bushing 2 is pushed into the housing part 1. It is advantageous for the mounting procedure and for the exact positioning of the bushing 2 in the housing part 1, as well as for the tight fit of the bushing 2, if the mounting is effected with the housing part 1 heated so that a safe press fit of the parts is obtained by shrinkage of the housing part during cooling. To insure that this shrinkage fit is not lost when the bearing is heated, it is useful to make the bushing 2 from a material having a coefficient of thermal expansion greater than that of the material of the housing part 1. The bushing 2 forms, with its previously exactly worked axial surfaces within the housing part 1, a supporting surface 3 and an abutment surface 4 with a high degree of plane parallelism and at an exact distance from each other and from the inner cylinder of the housing part 1.

The bushing 2 can also be fixed in other ways to the housing part 1, e.g. by gluing.

The abutment surface 4 provides a stop for the outer ring 5 of the first rolling bearing designated with the reference 6 generally, to be inserted from the free end into the housing part 1. This rolling bearing 6, designed as a self-contained angular contact ball bearing, is mounted on the shaft 8 when the shaft 8 is still outside the bearing housing. The shaft 8 contains the groove 7 for the balls. The shaft 8 and the rolling bearing 6 mounted on it form a unit which, during mounting of the bearing arrangement is pushed into the housing part 1 until the outer ring 5 is in intimate contact with the surface 4.

On the other side the shaft 8 is supported by a second rolling bearing 9 which is also an angular contact ball bearing. The two bearings 6 and 9 are mounted with the outer ring shoulders backing each other, resulting in the so-called back-to-back arrangement of the bearings. This arrangement does not lead to tensions which inadmissibly change the given stress under the generally arising greater heating of the shaft during bearing operation. The outer ring 10 of the second rolling bearing 9 is mounted with interference fit, tending to be a press fit in the housing part 1, and the same fit is used for the inner ring 11 on the shaft 8. A spring 12, preferably formed of disk springs, contacts the outer ring 10 on one side and the supporting surface 3 on the other side, tending to press the rolling bearing 9 away from the rolling bearing 6. A locating ring 13, pushed onto the shaft 8 when mounting the bearing arrangement, is attached to the inner ring 11, whereby the locating ring is mounted with a shrink fit on the shaft 8. To the other ring 10 is attached a ring 14 pushed into the heated housing part 1 when mounting the bearing arrangement and on which the housing part 1 is located with shrink fit when mounted.

The bearing housing is closed at both ends by seals 15 and 16. The inner space between the two rolling bearings 6 and 9 in the bearing housing can be used as storage space for the lubricant. For this purpose the bushing 2 can be provided with an internal circumferential groove 17 which is filled with the lubricant or into which a device is fitted for storing the lubricant or delivering it to the two bearings.

The assembly of the bearing illustrated in the mounted ready-for-operation position of the components is carried out as follows:

After the already described insertion of the bushing 2 in the housing part 1, the housing part 1 is heated in the area of the seat of the rolling bearing 6, and the unit consisting of the shaft 8 and the rolling bearing 6 is pushed into the housing part 1 until the outer ring 5 is in intimate contact with the abutment surface 4 of the bushing 2. After cooling of the housing part 1, the outer ring 5 is located therein. Due to the special configuration of the bushing 2 already mentioned above and the manner of its mounting in the housing part 1 as described above, a seat of high accuracy is obtained in the interior of the bearing housing 1, for the rolling bearing 6. The housing part 1 is then partially heated in the area of the seat of the rolling bearing 9 to be now mounted and is then placed with the end surface 18 of the shaft 8 on a plane horizontal assemblytable. The rolling bearing 6 is consequently subjected to the axial load arising from the weight of the housing part 1, the bushing 2 and the outer ring 5. The cup spring disks forming the spring 12 are now inserted into the open upper part of the housing part 1, then the rolling bearing 9 is pushed with its heated inner ring 11 onto the shaft 8 and with its outer ring 10 into the housing part 1. Also the heated locating ring 13 is pushed onto the shaft 8. A first mounting sleeve (not shown) enclosing the shaft 8 loosely is then positioned on the locating ring 13 whereby the mounting sleeve acts fully upon the locating ring 13 by its dead weight and possibly by additional weights placed on it, thereby pushing the ring 13 into intimate contact with the inner ring 11 and moving both rings 13 and 11 along the shaft 8. The force applied to the first mounting sleeve is transmitted via the rolling elements of bearing 9 also to its outer ring 10 and to the spring 12 contacting the supporting surface 3 of the bushing 2. The weight of the first mounting sleeve is so great that the spring 12 is thereby compressed also moving the outer ring 10. The bearing arrangement is now under the axial prestress defined by the weight of the first mounting sleeve. When, as a result of cooling, the locating ring 13 and the inner ring 11 shrink on the shaft 8 and the first mounting sleeve is removed from the locating ring 13, the prestress generated by the loaded spring 12 will remain. By the respective application of weight, this prestress is sufficiently high that it is distinctly greater than the prestress actually required for clearance-free running of the bearing. The reduction of this existing prestress to the prestress required for clearance-free running of the bearing is obtained by respective relieving of the outer ring 10. For this purpose a second mounting sleeve (not shown) is placed on the ring 14 fitted on the outer ring 10 and pushed into the partially heated housing part 1, whereby the second mounting sleeve not contacting the housing part 1 acts fully by its dead weight and possibly by additional weights placed upon the rings 14 and 10. The difference in weight of the lighter second mounting sleeve and its additional weights, compared with the first mounting sleeve and its additional weights, results in a relief and a remaining prestress of known magnitude. This prestress, together with the tension inherent in the components of both rolling bearings, owing to inner deformations after shrinkage of the bearing housing 1 upon the ring 14 and the outer ring 10 and the consequent location of the parts in their respective positions remains when the second mounting sleeve is finally removed. Loading by the second mounting sleeve brings about a further compression of the spring 12 to such a degree that the parts of the two rolling bearings 6 and 9 which are deformed like a spring and therefore tensioned under the force of the first mounting sleeve, relieve by the respective movement of the outer ring 10.

the inner diameter of the inner ring 11 and of the locating ring 13, as compared with the diameter of the shaft 8, are selected so that the inner ring, due to shrink fit caused by cooling of these rings, is finally fitted with an interference fit tending to be a press fit on the shaft 8, whereas a press fit on the shaft 8 is finally obtained for the locating ring 13. The outer diameters of the outer ring 10 and the ring 14, as compared with the inner diameter of the housing part 1, are selected so that by shrink fit of the housing part 1 upon both, the outer ring 10 obtains finally also an interference fit tending to be a press fit and the ring 14 obtains a press fit in the housing part 1.

Since only forces from displacing parts, namely the rings 13 and 14, act during the prestressing of the rolling bearing 9, and since the rings 13 and 14 move without any tilting owing to the vertical position of the shaft 8 and the fitted mounting sleeves, it is possible to obtain for the rolling bearing 9 the adjustment and location in the bearing housing 1 and relative to the rolling bearing 6 which ensures a high running accuracy. For functional reasons both rolling bearings must be in a position to accommodate combined loads. Instead of the presented design using two angular contact ball bearings, the bearing arrangement can also incorporate deep groove ball bearings or, for mounting reasons, possibly also magneto ball bearings or taper roller bearings.

The above description of the preferred embodiment is presented for illustrative purposes only and is not intended to limit the scope of the present invention as recited in the appended claims. Modifications may be effected by one having ordinary skill in the art without departing from the scope of the inventive concept herein disclosed.

I claim:

1. A method for assembling a bearing arrangement having prestress in the axial direction, the bearing arrangement having a shaft, a housing having a bore, and a pair of first and second axially spaced rolling bearings, each having inner and outer rings located between the shaft and the bore of the housing, said method comprising the steps of axially affixing said first bearing on said shaft and within said housing, supporting said bearing arrangement on said shaft in a vertical direction, inserting a spring in said housing, to axially abut stop means therein, inserting said second bearing on said shaft and in said housing to engage said spring, inserting inner and outer locating rings on said shaft and in said housing to abut the inner and outer rings of said second bearing respectively, axially loading said inner locating ring downwardly and then fixedly holding said inner ring of said second bearing and said inner locating ring on said shaft, then axially preloading said outer locating ring downwardly, to an extent less than the axial preloading of said inner locating ring, and then fixedly holding said outer ring of said second bearing and the outer locating ring in said bore.

2. The method of claim 1 wherein said steps of fixedly holding comprise shrink fitting.

* * * * *